US007755642B2

(12) United States Patent
Fujimoto

(10) Patent No.: US 7,755,642 B2
(45) Date of Patent: Jul. 13, 2010

(54) HIGH SPEED IMAGE PROCESSING METHOD AND APPARATUS, PROGRAM PRODUCT OF THE METHOD, COMPUTER READABLE MEDIUM OF THE PRODUCT, AND IMAGE FORMING SYSTEM HAVING THE APPARATUS

(75) Inventor: Ayako Fujimoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1261 days.

(21) Appl. No.: 11/288,396

(22) Filed: Nov. 29, 2005

(65) Prior Publication Data

US 2006/0132494 A1 Jun. 22, 2006

(30) Foreign Application Priority Data

Nov. 30, 2004 (JP) ............................. 2004-346255

(51) Int. Cl.
G09G 5/39 (2006.01)
(52) U.S. Cl. ..................................................... 345/619
(58) Field of Classification Search .................. 345/619
See application file for complete search history.

(56) References Cited

U.S. PATENT DOCUMENTS

| 5,062,055 | A | * | 10/1991 | Chinnaswamy et al. ...... 702/182 |
| 5,303,334 | A | * | 4/1994 | Snyder et al. ................. 358/1.9 |
| 5,504,916 | A | * | 4/1996 | Murakami et al. ............. 712/36 |
| 5,585,864 | A | * | 12/1996 | Takeuchi ..................... 348/719 |
| 5,594,860 | A | * | 1/1997 | Gauthier ...................... 345/543 |
| 5,687,296 | A | * | 11/1997 | Shimada ....................... 358/1.2 |
| 5,812,791 | A | * | 9/1998 | Wasserman et al. .......... 709/247 |
| 5,880,741 | A | * | 3/1999 | Takeuchi ...................... 345/626 |
| 6,208,772 | B1 | * | 3/2001 | Wilt et al. .................... 382/308 |
| 6,633,298 | B2 | * | 10/2003 | Ashburn et al. .............. 345/537 |
| 6,680,737 | B2 | * | 1/2004 | Ashburn et al. .............. 345/531 |
| 6,697,081 | B1 | * | 2/2004 | Ito ............................... 345/619 |
| 6,825,827 | B2 | * | 11/2004 | Miura .......................... 345/98 |
| 6,891,638 | B1 | * | 5/2005 | Iizumi et al. ................. 358/1.9 |
| 6,961,085 | B2 | * | 11/2005 | Sasaki ....................... 348/222.1 |
| 7,336,386 | B2 | * | 2/2008 | Oteki et al. ................. 358/1.16 |
| 2003/0016390 | A1 | * | 1/2003 | Yuasa ......................... 358/1.16 |
| 2003/0064747 | A1 | * | 4/2003 | Simmons et al. ............ 455/550 |
| 2003/0090486 | A1 | * | 5/2003 | Ashburn et al. ............. 345/422 |
| 2003/0110320 | A1 | * | 6/2003 | Ono et al. ...................... 710/1 |
| 2005/0050241 | A1 | * | 3/2005 | Furuta et al. ................. 710/22 |
| 2006/0161720 | A1 | * | 7/2006 | Bai et al. .................... 711/100 |
| 2007/0288974 | A1 | * | 12/2007 | Creamer et al. ............. 725/105 |
| 2008/0049029 | A1 | * | 2/2008 | Kurata et al. ................ 345/519 |

FOREIGN PATENT DOCUMENTS

| JP | 5-201077 (A) | 8/1993 |
| JP | 08-194812 | 7/1996 |

(Continued)

Primary Examiner—Javid A Amini
(74) Attorney, Agent, or Firm—Harness, Dickey & Pierce, P.L.C.

(57) ABSTRACT

This patent specification describes a image processing apparatus which includes a CPU (central processing unit) configured to control the image processing apparatus, a memory configured to store data and an image processing device configured to read a source image stored in a storage area of the memory and implement a batch processing for a plurality of objects of the source image.

2 Claims, 17 Drawing Sheets

FOREIGN PATENT DOCUMENTS

| | | |
|---|---|---|
| JP | 11-240227 (A) | 9/1999 |
| JP | 2000-050059 | 2/2000 |
| JP | 2000-148663 | 5/2000 |
| JP | 2002-064701 | 2/2002 |
| JP | 2002-132706 | 5/2002 |
| JP | 2002-254729 | 11/2002 |

\* cited by examiner

FIG. 17

| | |
|---|---|
| · IpaOpen () | OPEN IPA DEVICE |
| · IpaClose () | CLOSE IPA DEVICE |
| · IpaRegObj () | CHECK ERROR OF OBJECT AND REGISTER OBJECT DATA |
| · IpaRegGammaUcr () | REGISTER GAMMA & UCR DATA |
| · IpaRegRot () | SPECIFY OPERATION ONLY FOR ROTATION |
| · IpaNoReg () | SPECIFY OPERATION WITH NEITHER GAMMA & UCR DATA NOR ROTATION |
| · IpaExec () | BOOT IPA |

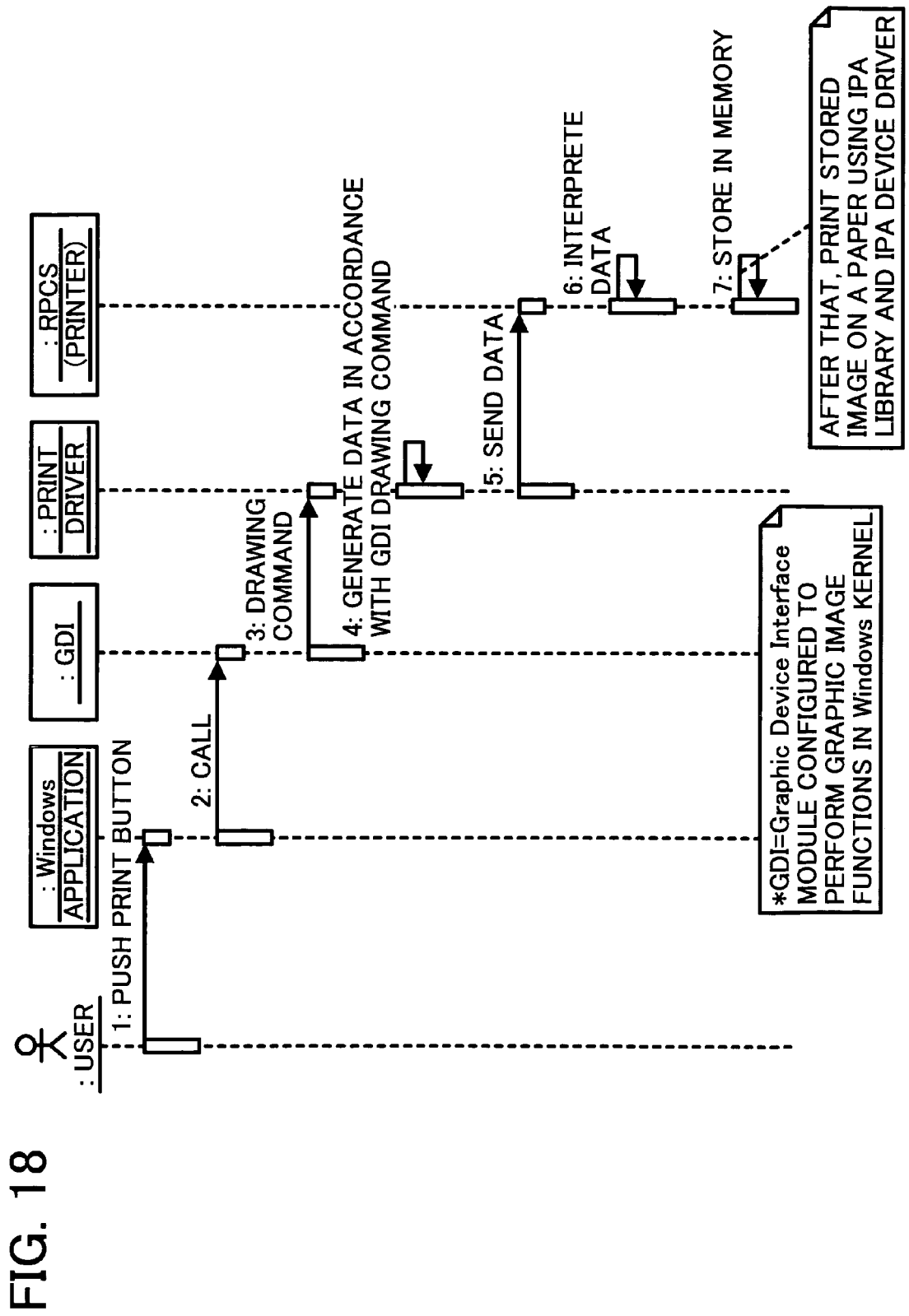

HIGH SPEED IMAGE PROCESSING METHOD AND APPARATUS, PROGRAM PRODUCT OF THE METHOD, COMPUTER READABLE MEDIUM OF THE PRODUCT, AND IMAGE FORMING SYSTEM HAVING THE APPARATUS

BACKGROUND

1. Field

This patent specification describes a high speed image processing method and apparatus which implements a batch process for a plurality of source image objects. This patent specification also describes a program product of the method, a computer readable medium having the program product, and an image forming system having the apparatus.

2. Discussion of the Background

In response to an increasing demand for a high resolution and speed, improvements to printing systems such as a page printer have been made mainly by implementing advanced CPUs (central processing unit). It has been difficult, however, to satisfy the demand merely by the CPU performances although the development of high performance CPUs has been rapid. Especially, a color printing system such as a color laser printer needs to perform a variety of image processing including an image zoom for C, M, Y and K type images, a dither processing and a color translation processing.

Owing to the recent development of semiconductor technology, a specific hardware accelerator becomes capable of performing a part of the image processing of the printing systems which is conventionally performed by the CPU. For example, some of the printing systems employ the above-mentioned hardware accelerator in a form of an FPGA (field programmable gate array) so that a change of image processing functions may easily be taken place.

However, the performance of the hardware accelerator is still not sufficient to meet the demand for the high resolution and speed on the image processing of the printing system. Accordingly, it is yet difficult to allocate a sufficient number of high speed memories to a halftone generation which particularly requires a high speed One attempt to respond to the above-described demand for a high resolution and speed uses a threshold-value-matrix page memory and reads. In this attempt, threshold data are stored line by line into registers for a repetitive use when they are read from the threshold-value-matrix page memory. Then, the threshold data are selectively sent to a plurality of comparators and are subjected to a plurality of parallel comparisons. After that, the threshold data stored in the registers are sequentially shifted line by line for a repetitive use.

In this attempt, however, either one of the image zoom and the halftone generation under processing is inevitably required to be stopped in a system having a single main memory system with no extra memory for dither data, when these two functions are performed at the same time.

SUMMARY OF THE INVENTION

This patent specification describes a novel image processing apparatus which includes a CPU (central processing unit) configured to control the image processing apparatus, a memory configured to store data and an image processing device configured to read a source image stored in a storage area of the memory and implement a batch processing for a plurality of objects of the source image.

This patent specification further describes a novel method for performing image processing which includes storing data in a storage of a memory, reading a source image stored in a storage area of the memory; and implementing a batch processing for a plurality of objects of the source image in accordance with a command read DMA which reads commands.

Further, this patent specification describes a novel computer program for printing processing which includes means for implementing to read command read DNA which reads commands from a storage, first means for reading a source image data from the storage, means for implementing a rotation DMA which performs rotation of the source image data and storing the results in the storage, means for allowing the implementation of the rotation DMA, means for implementing a gamma & UCR processing DMA which performs gamma & UCR processing and storing the results in the storage, means for allowing the implementation of the gamma & UCR processing DMA, means for implementing image data read DMA, dither read DMA and processing image write DMA at every line after the implementation of the rotation DMA and gamma & UCR processing DMA and means for checking an existence/nonexistence of a complete interruption which is an indication of absence of a following object.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 17 is an example library function used in the sequence of the basic process flow shown in FIG. 16; and FIG. 18 is a sequential time chart of an example sequence from a designation of a printing function to a print on a printer.

DETAILED DESCRIPTION OF PREFERRED EMBODIMENTS

Figure 1:
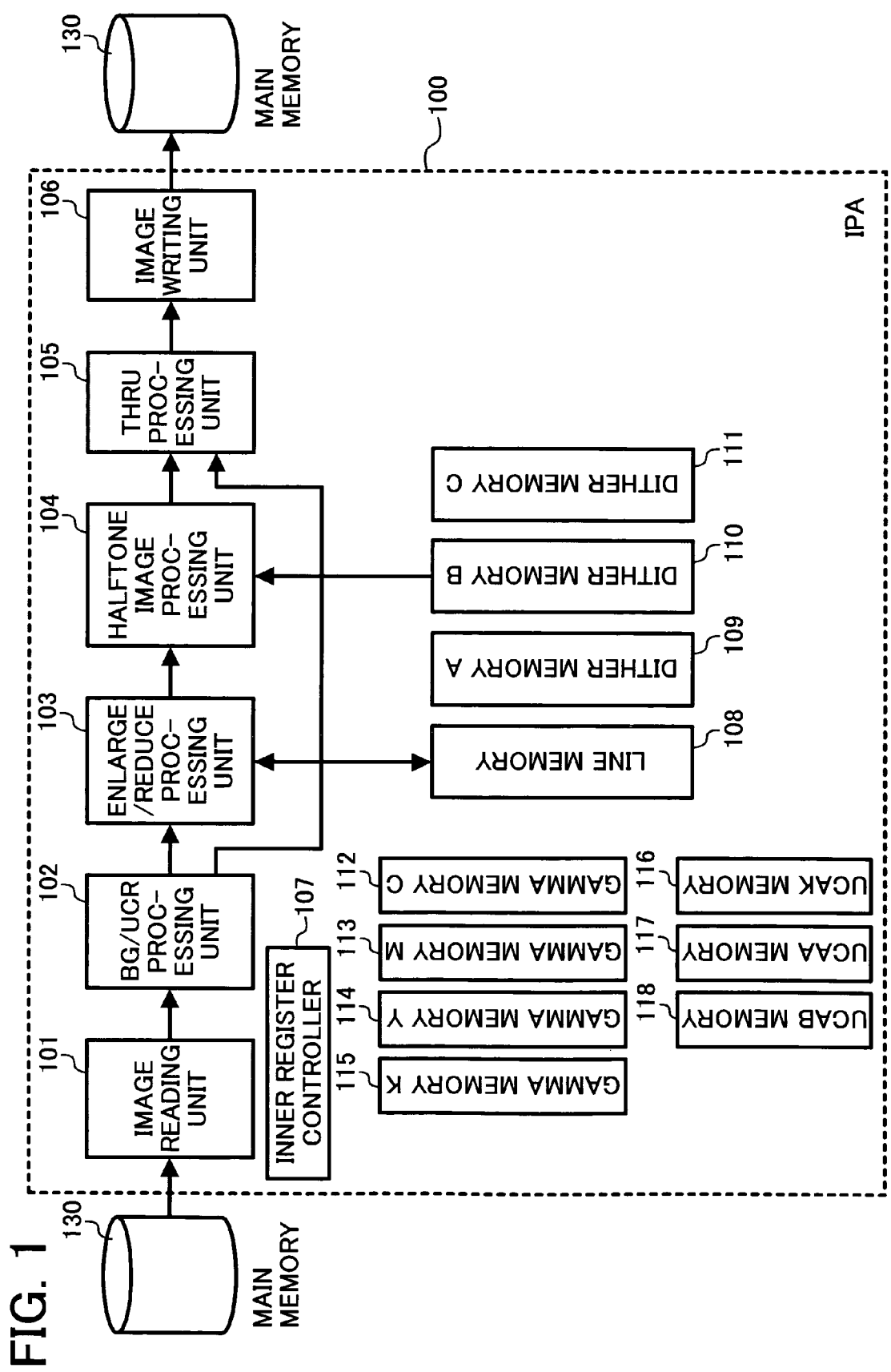
FIG. 1 is a schematic block diagram of an image processing accelerator (IPA) according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a document illumination apparatus according to an embodiment of the present invention is described.

FIG. 1 illustrates a block diagram of an exemplary embodiment of an image processing accelerator (IPA) 100. The IPA 100 includes an image reading unit 101, a BG/UCR processing unit 102, an enlarge/reduce processing unit 103, a halftone image processing unit 104, a THRU processing unit 105, an image writing unit 106, an inner register controller 107, a line memory 108, a first to a third dither memories 109, 110, 111, a first to a fourth gamma memories 112, 113, 114, 115 and a first to a third UCA memories 116, 117, 118.

The IPA 100 reads an image data from a storage area of a main memory 130 and executes a predetermined image processing at the each unit. Then the IPA 100 stores the processed image data into other storage area of the main memory 130 for a next process step.

The image reading unit 101 reads the image data from the main memory 130 and transfers it to the BG/UCR processing unit 102. The BG/UCR processing unit 102 performs a BG processing, an UCR processing and an UCA processing. The BG processing is to convert a CMY image data to a K-type image data (black image), the UCR process is to convert the gray-type image data to the K-type image data (black image) and the UCA process is to convert the CMY image data to a CMYK image data. The BG/UCR processing unit 102 uses the first to the fourth gamma memories 112, 113, 114, 115 and a processing of a gamma correction is performed for each color. In the UCA processing, the first to the third UCA memories 116, 117, 118 are used and the CMY image data is converted to a CMYK image data.

The image data which is processed with a predetermined manner at the BG/UCR processing unit 102 is input to the enlarge/reduce processing unit 103 and the THRU processing unit 105. If an enlarge/reduce processing is requested, the enlarge/reduce processing unit 103 stores the image data line by line in the line memory 108, performs an enlarge/reduce processing and sends the processed image data to the halftone image processing unit 104.

The halftone image processing unit 104 converts the multilevel CMYK image data to binary/four valued image data by a fixed threshold/dither method. During the conversion, the first to third dither memories 109, 110, 111 are used to realize a pseudo-halftone. Four-valued data are created by comparing predetermined threshold values stored in the memories 109, 110, 111. In the case of binary halftone, one dither memory is enough to create data.

The inner register controller 107 controls an inner register in the IPA 100. The THRU processing unit 105 just transmits the image data which is processed in the halftone image processing unit 104 or in the BG/UCR processing unit 102 to the image writing unit 106. The image writing unit 106 writes the processed image data in the previous process steps into a different area of main memory from the area at reading.

Figure 2:
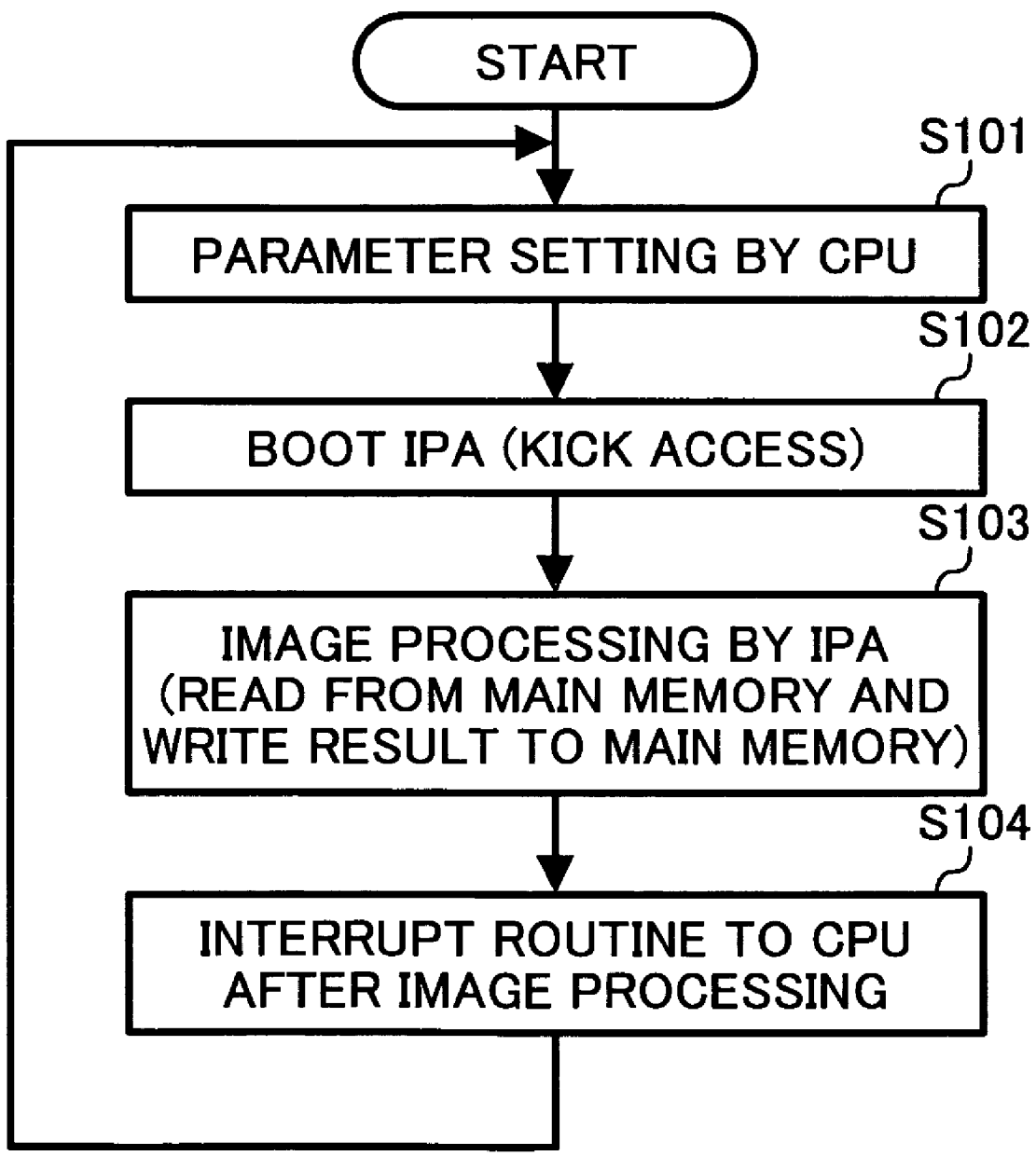
FIG. 2 is a flowchart of an example procedure of the IPA shown in FIG. 1.
Figure 3:
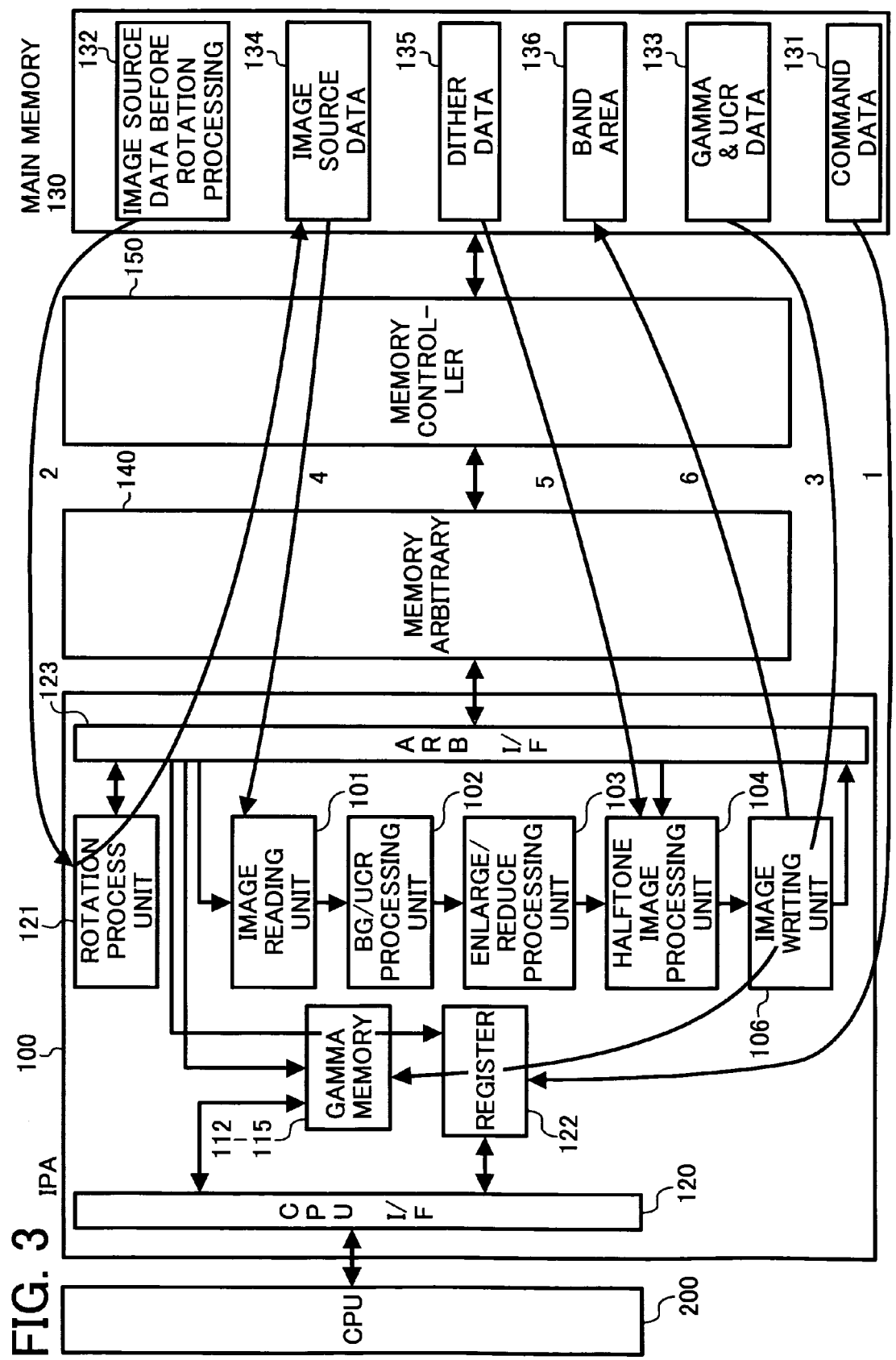
FIG. 3 is a schematic block diagram for explaining a relationship between a DMA (Direct Memory Access) processing and an image forming performed in the IPA shown in FIG. 1.

FIG. 2 illustrates a flowchart showing an outline of a procedure of the IPA 100 shown in FIG. 1. FIG. 3 is an illustration showing a relationship between a DMA (Direct Memory Access) processing and a image forming performed in the IPA 100 shown in FIG. 1.

The processing shown in FIG. 2 is performed and repeated at every object which is read from a storage area of main memory 130. At the beginning, parameters are set by a CPU 200. (S101) The IPA 100 is booted by kicking a KICK register. (S102) By booting the IPA 100, an image processing operation of the IPA 100 is started. As described above using FIG. 1, an image data is read from a storage area of the main memory 130 at the beginning. Then, a processed result data is written in another storage area of the main memory 130. (S103) The IPA 100 performs an interrupt routine to CPU 200 after the image processing. (S104) Then, the IPA 100 enters a wait state until an input of a next object. This procedure is repeated at every object.

In FIG. 3, the IPA 100 is connected to a CPU 200 through an CPU interface 120 and is connected to a memory arbiter 140 through a memory arbiter interface (ARB I/F) 123. The memory arbiter 140 is connected to a memory controller 150. And the memory controller 150 is connected to the main memory 130. By this configuration, an access between the IPA 100 and the main memory 130 becomes possible.

A register 122 of the IPA 100 can access the CPU 200 through the CPU interface 120 and can be accessed by the memory arbiter 140 through the memory arbiter interface 123. Similarly, gamma memories, 112 to 115, can access the CPU 200 through the CPU interface 120 and can be accessed by the memory arbiter 140 through the memory arbiter interface 123. The main memory 130 stores command data 131, a source image data 132 which is a data before rotation process, gamma & UCR data 133, source image data 134, dither data 135 and a band region data 136. The IPA 100 can directly access the main memory 130 using the DMA processing with no instruction from the CPU 200. During the DMA processing, a plurality of the commands are read sequentially and are executed with a batch processing.

Figure 4:
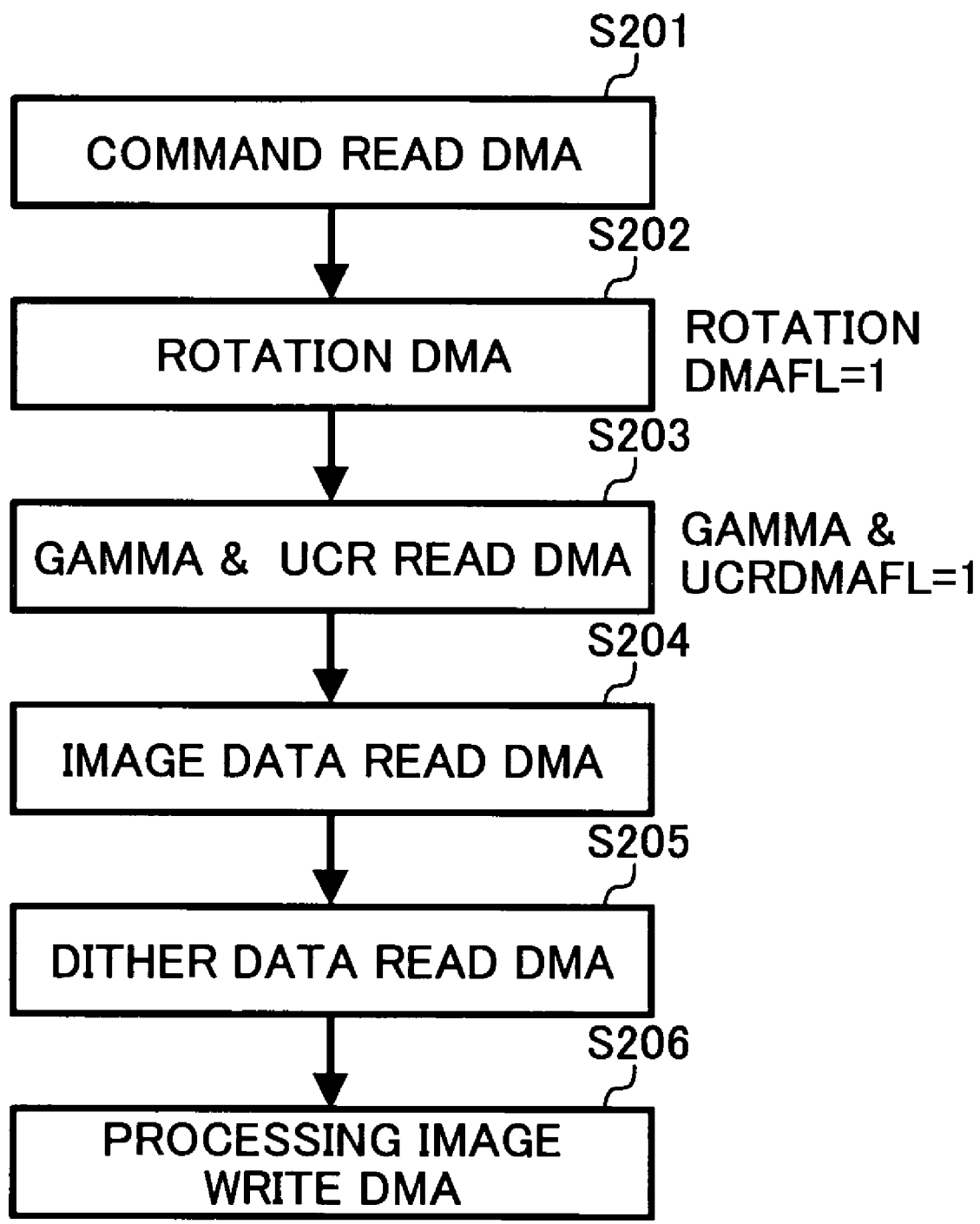
FIG. 4 is a flowchart of an example procedure of the DMA processing.

FIG. 4 illustrates a flowchart of a procedure of the DMA processing. In this embodiment, the plurality of objects, which are read from the source image data and are processed, are recognized as one descriptor and are executed with a batch processing in accordance with a command read DMA which reads commands. Therefore, the DMA processing includes following DMA commands.

1) command read DMA
2) rotation DMA
3) gamma & UCR read DMA
4) source image data read DMA
5) dither data read DMA
6) processing image write DMA The command read DMA (command DMA) is a processing task to connect the a plurality of image data and make a bigger image data. The command DMA is performed at every object and makes it possible to save idle time of the CPU due to interruption. The rotation DMA rotates an image specified by an address by a specified rotation angle and writes it into a storage area of specified addresses. (per 90 degree in this embodiment) The gamma & UCR read DMA performs a gamma correction and an UCR processing at every first object of a page.

The source image data read DMA reads an image data to be processed in a horizontal direction at every line. The dither pattern, which the IPA 100 executes, is read data is read from the dither memory 108 to 111 by the dither data read DMA. The processed image data is written by the processing image write DMA in a horizontal direction at every line. The notations of the processing tasks of 1) to 6) DMA corresponds to the notations 1 to 6 shown in FIG. 3. The processing tasks of DMA 1) to 3) are specified by an user. The processing tasks of DMA 4) to 6) are specified automatically by the IPA 100.

In the case of FIG. 3, a command data 131 is read from the main memory 130 by command DMA and is stored into the register 122 at first. If rotation is requested, a source image is read by the rotation DMA from the source image data 132 which is a data before rotation process and is send to the rotation processing unit 121. The source image is stored as a source image data 134 in a storage area of the main memory 130 assigned by specifying addresses in accordance with the rotation DMA processing. Meanwhile, gamma & UCR data 133 is read from the main memory 130 by the gamma & UCR read DMA and stored in the gamma memories 112 to 115.

Secondary, the image data which is processed with the rotation processing is read from the source image data 134 by the source image data read DMA and is sent to the image reading unit 101. At the BG/UCR processing unit 102, the IPA 100 performs BG/UCR processing with the source image data sent to the image reading unit 101. Then, the processed image data is sent to the HFT processing unit 104.

The HFT processing unit 104 reads dither data 135 from the main memory 130 by the dither data read DMA. If the dither data is a binary halftone, a threshold value from one of the dither memories, 109 to 111, is used to perform a halftone processing. If the dither data is a four-valued halftone, three threshold values out of the dither memories, 109 to 111, are used. The processed image data with halftone processing is then sent to the image writing unit 106 and stored in a band area 136 of the main memory 130 by the processing image write DMA.

In this exemplary embodiment, one processing to perform for one object is illustrated. A command data for a command DMA is read at the beginning and then following processing tasks are performed. plurality of objects are performed successively (with one instruction) similarly. To perform this successive processing, an interrupt routine is executed at every processing.

The IPA 100 is booted by kicking KICK register as shown in the flowchart of FIG. 4 which illustrates the procedure of the DMA processing. Then, all DMA processing tasks such as a command DMA 1, a rotation DMA 2, a gamma & UCR read DMA 3, a source image data read DMA 4, a dither data read DMA 5 and a processing image write DMA 6 are performed as shown in FIG. 4. (S201 to 206)

The rotation DMA 2 is performed when a flag of rotation DMA is "1" (FL=1) and the gamma & UCR DMA 4 is performed when a flag of rotation DMA is "1" (FL=1). The flags are to be defined by user. In this case, a so-called command chain in which DMA command DMA 1 to 6 are repeated can be set.

After all the DMA processing tasks are performed, a command "complete interruption" is generated finally. The steps from the image data read DMA of the Step 4 to the processing image write DMA of Step 6 are implemented at every line. The processing steps are repeated by a necessary number for all corresponding lines read.

In the case of FIGS. 3 and 4, the interruption cause problems and should be carefully determined. Therefore, the introduction of interruption with DMA and the interruption timing will be discussed.

Figure 5:
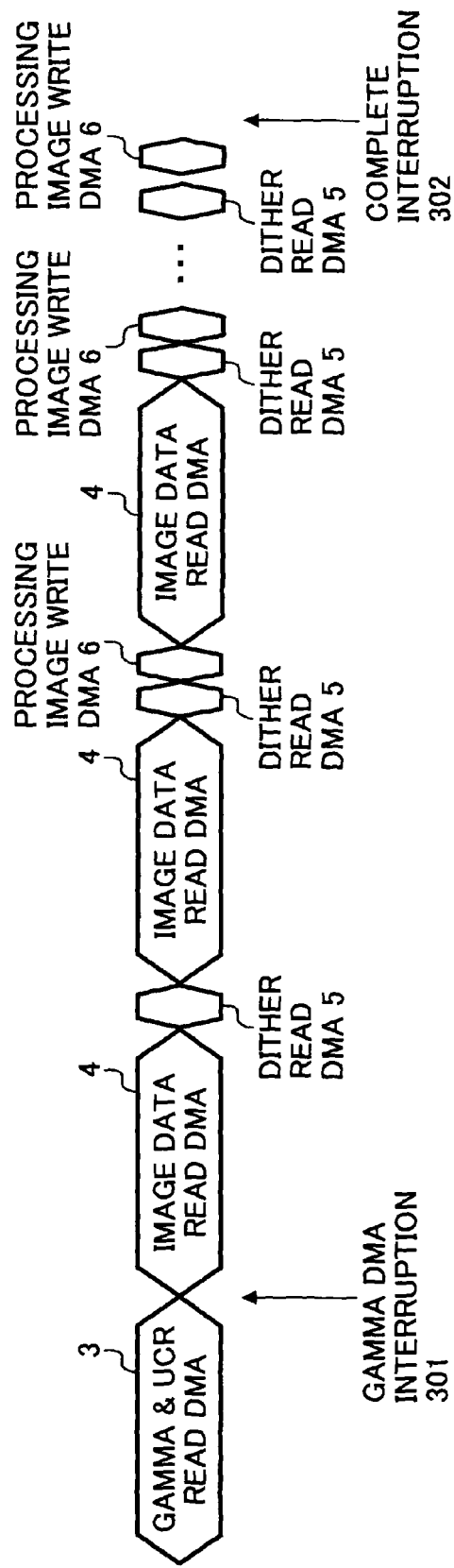
FIG. 5 is a timing diagram of an image drawing performed without using a command DMA during a DMA process.

FIG. 5 illustrates a timing diagram of a job in which drawing process is just performed and no command DMA is used during DMA processing. When the job includes a gamma & UCR read DMA 3, source image data read DMA 4, dither data read DMA 5, source image data read DMA 4, dither data read DMA 5, processing image write DMA 6, . . . dither data read DMA 5, processing image write DMA 6 as shown in FIG. 5, an interruption of a gamma interruption DMA 301 is generated at the end of writing the gamma & UCR read DMA 3 and a complete interruption 302 is generated finally. After that, the one job is completed.

Thus, similarly to next job, the processing is performed after a generation of gamma interruption DMA 301 until a generation of a complete interruption 302. And it is performed for the objects, one after another. The complete interruption 302 is generated when next object is not followed.

In printer application, an object is registered by a library function IpaReg0b j( ) which is shown later and the data format of the object is defined as follows.

OBJHEADER
CMYKMODE
DATATYPE
XWIDTH
YWIDTH
•
•
•

The first data format OBJHEADER includes a bit flag which indicates existence or nonexistence of a next object. If the bit flag is "1", the IPA 100 recognizes that the object is the last object and generates a complete interruption after drawing with the object data. In this embodiment, using the command DMA interruption which reads command from the command data 131 and the complete interruption 302, the IPA 100 can execute a plurality of objects with a batch processing.

Figure 6:
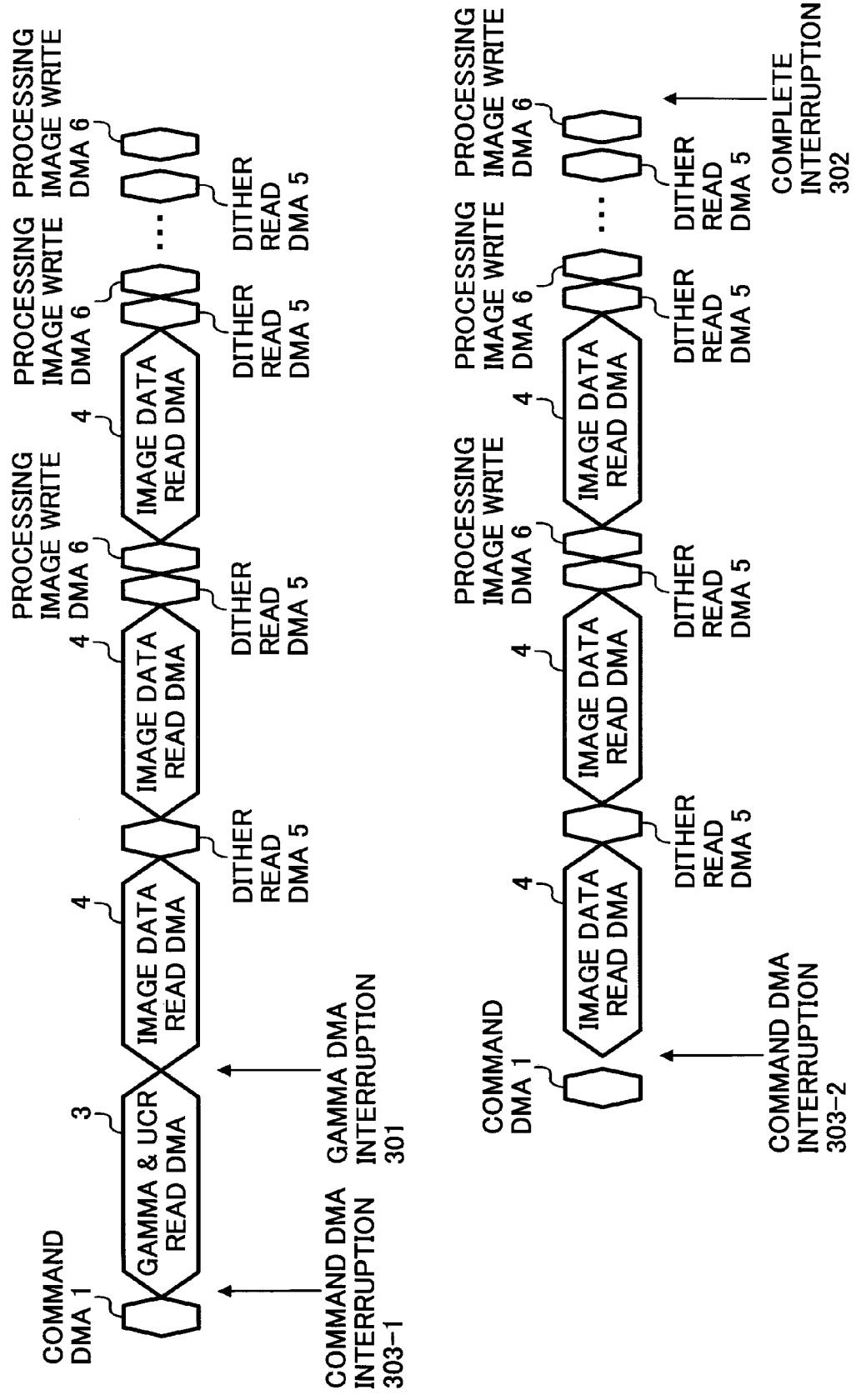
FIG. 6 is a timing diagram of the image drawing performed with using the command DMA.

FIG. 6 illustrates a timing diagram of another job when drawing is performed using a command DMA. A first command DMA interruption 303-1 is generated in this job. The job includes a command DMA, a gamma & UCR read DMA 3, source image data read DMA 4, dither data read DMA 5, source image data read DMA 4, dither data read DMA 5, processing image write DMA 6, . . . dither data read DMA 5, processing image write DMA 6. Then, another command DMA interruption 303-2 is generated. After the command DMA, a gamma & UCR read DMA 3, source image data read DMA 4, dither data read DMA 5, source image data read DMA 4, dither data read DMA 5, processing image write DMA 6, . . . dither data read DMA 5, processing image write DMA 6 follow. And a complete interruption 302 is generated finally. Then, the job is completed.

In this job, a series of DMA processing tasks from the first command DMA interruption 303-1 to the DMA processing before the second command DMA interruption 303-2 is for a first object. And a series of DMA processing tasks after the second command DMA interruption 303-2 is for a second object. Thus, the processing tasks between the first command DMA interruption 303-1 and the complete interruption 302 is treated as a processing unit. If a plurality of objects having n-number are included, a plurality of command DMA interruption having n-number (303-1, 303-2, . . . , 303-*n*) are generated, similarly.

Figure 7:
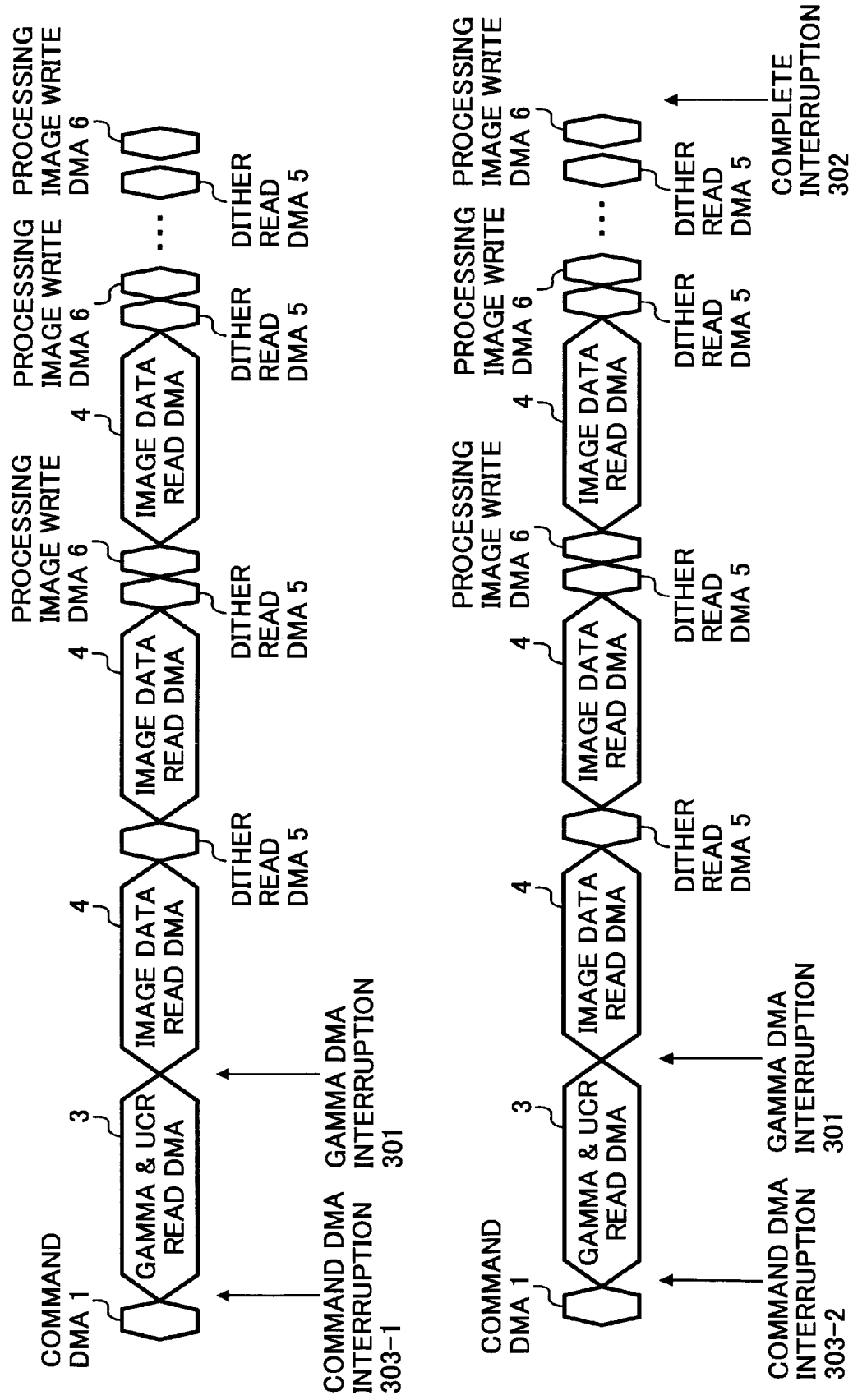
FIG. 7 is a timing diagram of the image drawing performed with using the command DMA via an execution of a gamma-UCR read DMA per object.

FIG. 7 illustrates a timing diagram of another job in which drawing processing is only performed using a command DMA. In this embodiment, gamma & UCR read DMA 3 is executed at every object. After the second command DMA interruption 303-2, gamma & UCR read DMA 3 interrupts and a gamma DMA interruption 301 is generated. In this job, a series of DMA processing tasks from the first command DMA interruption 303-1 to the DMA processing before the second command DMA interruption 303-2 is for a first object. And a series of DMA processing tasks after the second command DMA interruption 303-2 until a complete interruption 302 is for a second object.

Figure 8:
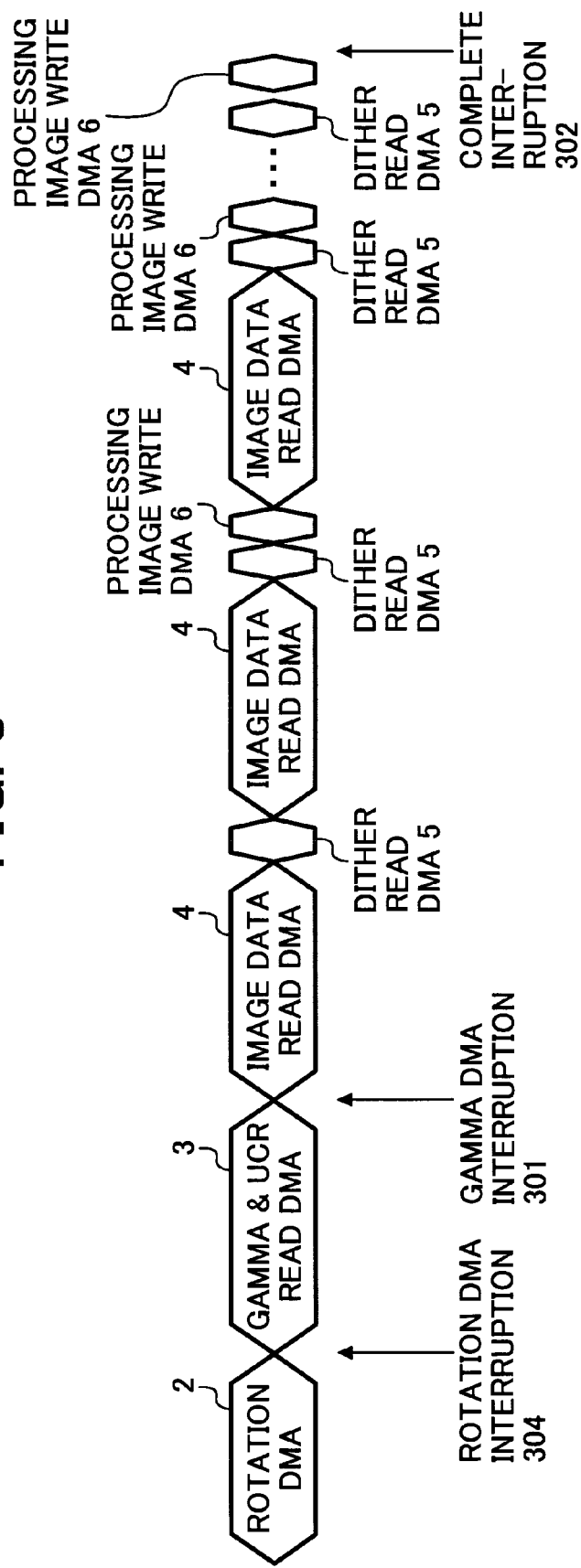
FIG. 8 is a timing diagram of an image rotation and the image drawing without using the command DMA.

FIG. 8 illustrates a timing diagram of another job in which rotation and drawing processing tasks are performed without using a command DMA. In this embodiment, a processing of a rotation DMA 2 is interrupted before an interruption of the gamma & UCR read DMA 3 of FIG. 5. Namely, a rotation DMA interruption 304 is inserted for performing the rotation DMA 2. Other DMA processing tasks are similarly processed as the case of FIG. 5.

Figure 9:
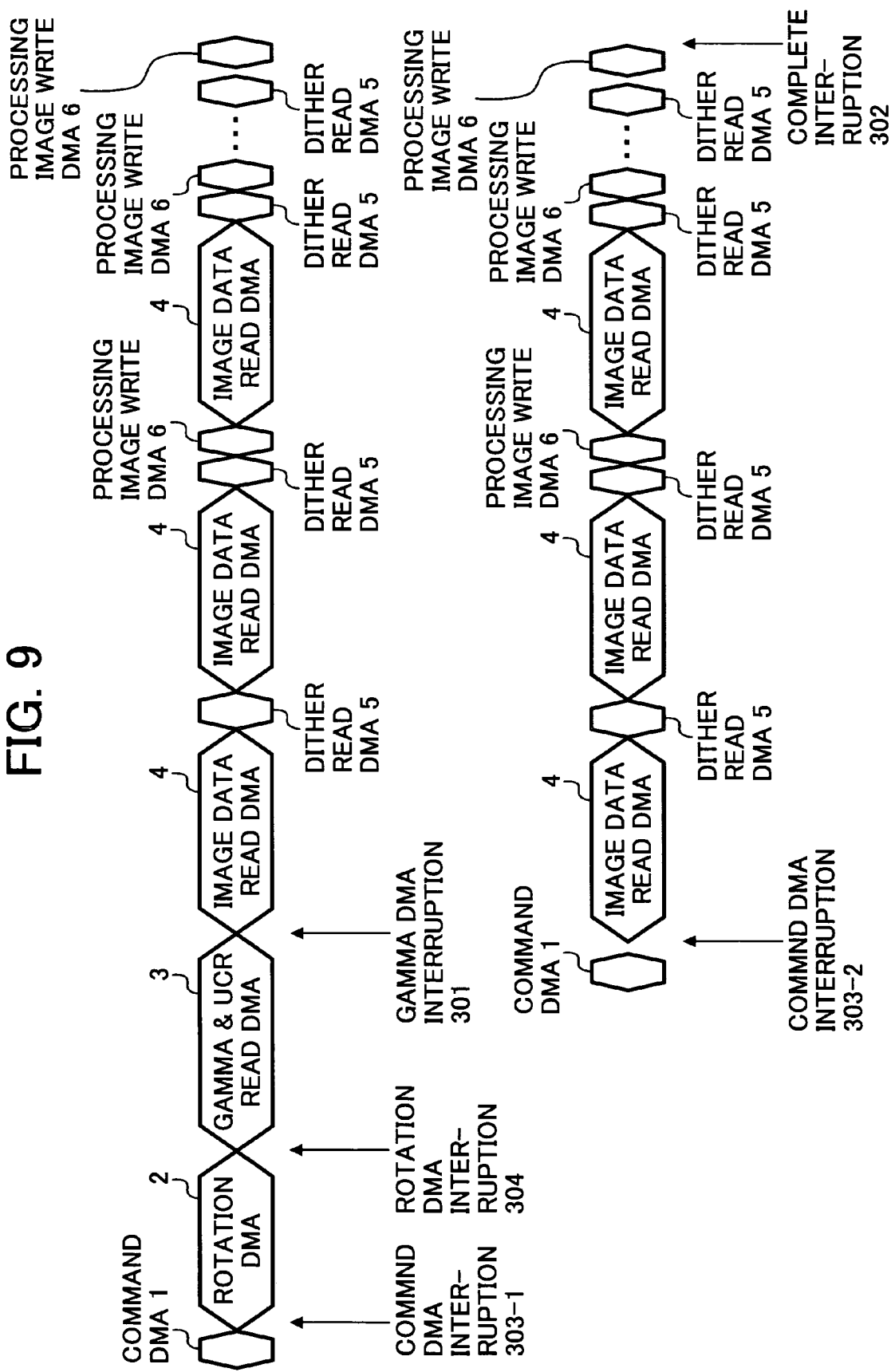
FIG. 9 is a timing diagram of the image rotation and the image drawing performed with using the command DMA.

FIG. 9 illustrates a timing diagram of another job when rotation and drawing are performed using a command DMA addition to the job shown in FIG. 8. In this embodiment, a command DMA 1 is performed before the rotation DMA 2 of FIG. 8 and at a beginning of a next object. Namely, a rotation DMA 2 is performed after the first command DMA interruption 303-1 and then a rotation DMA interruption 304 is generated. Other DMA processing tasks are similarly processed as the case of FIG. 6.

In this job, again, a series of DMA processing tasks from the first command DMA interruption 303-1 to the DMA processing before the second command DMA interruption 303-2 is for a first object. And a series of DMA processing tasks after the second command DMA interruption 303-2 until a complete interruption 302 is for a second object.

Figure 10:
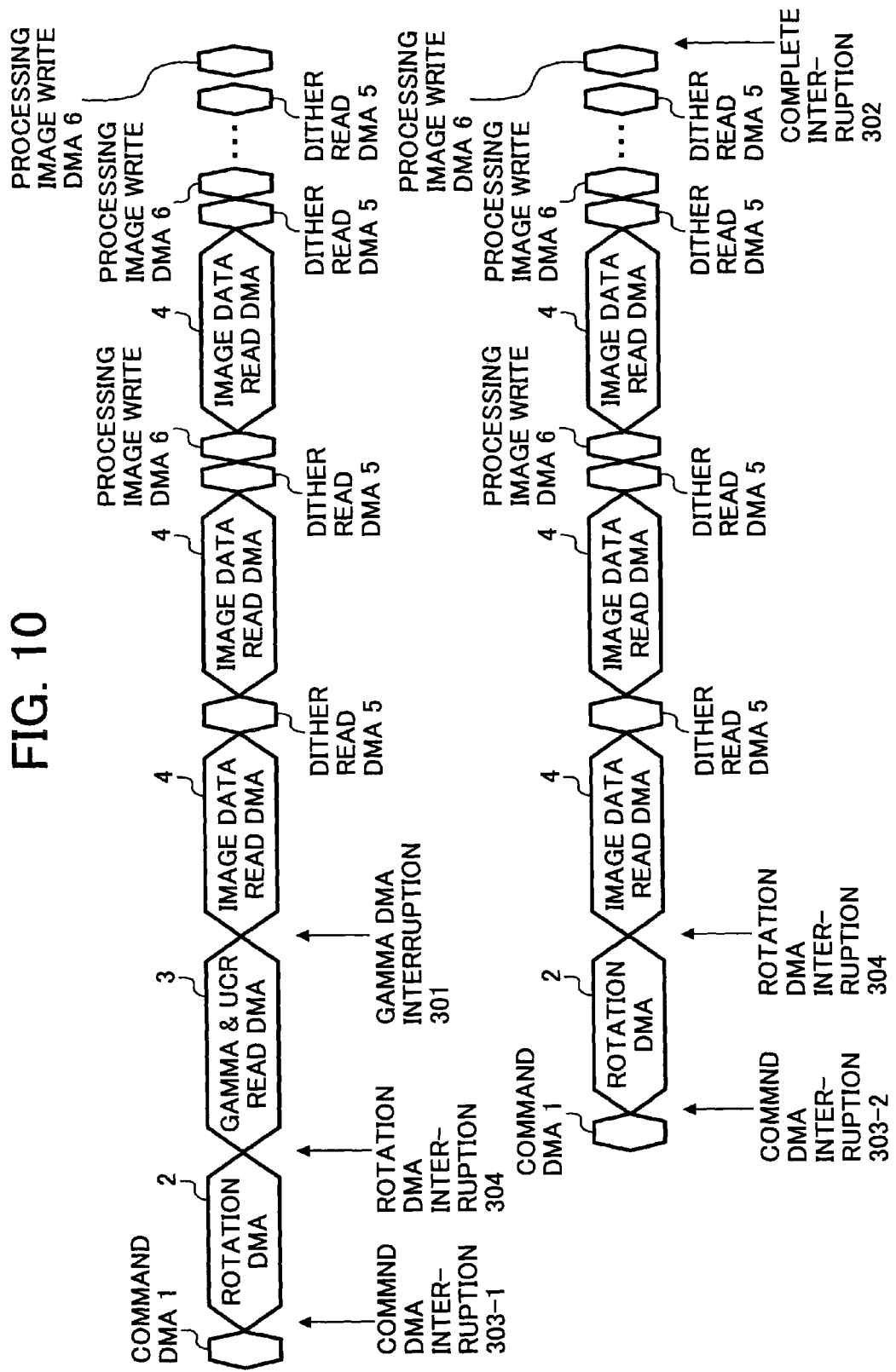
FIG. 10 is a timing diagram of the image rotation and the image drawing performed using the command DMA via an execution of an image rotation DMA per object.

FIG. 10 is a timing diagram of another job in which rotation and drawing processing are implemented using a command DMA. In this embodiment, a rotation DMA is executed at every object. In addition to the exemplary embodiment of FIG. 9, a rotation DMA is performed after the second command DMA interruption so that a rotation DMA interruption 304 is inserted. Similarly in this job, a series of DMA processing tasks from the first command DMA interruption 303-1 to the DMA processing before the second command DMA interruption 303-2 is for a first object. and a series of DMA processing tasks after the second command DMA interruption 303-2 until a complete interruption 302 is for a second object.

Figure 11:
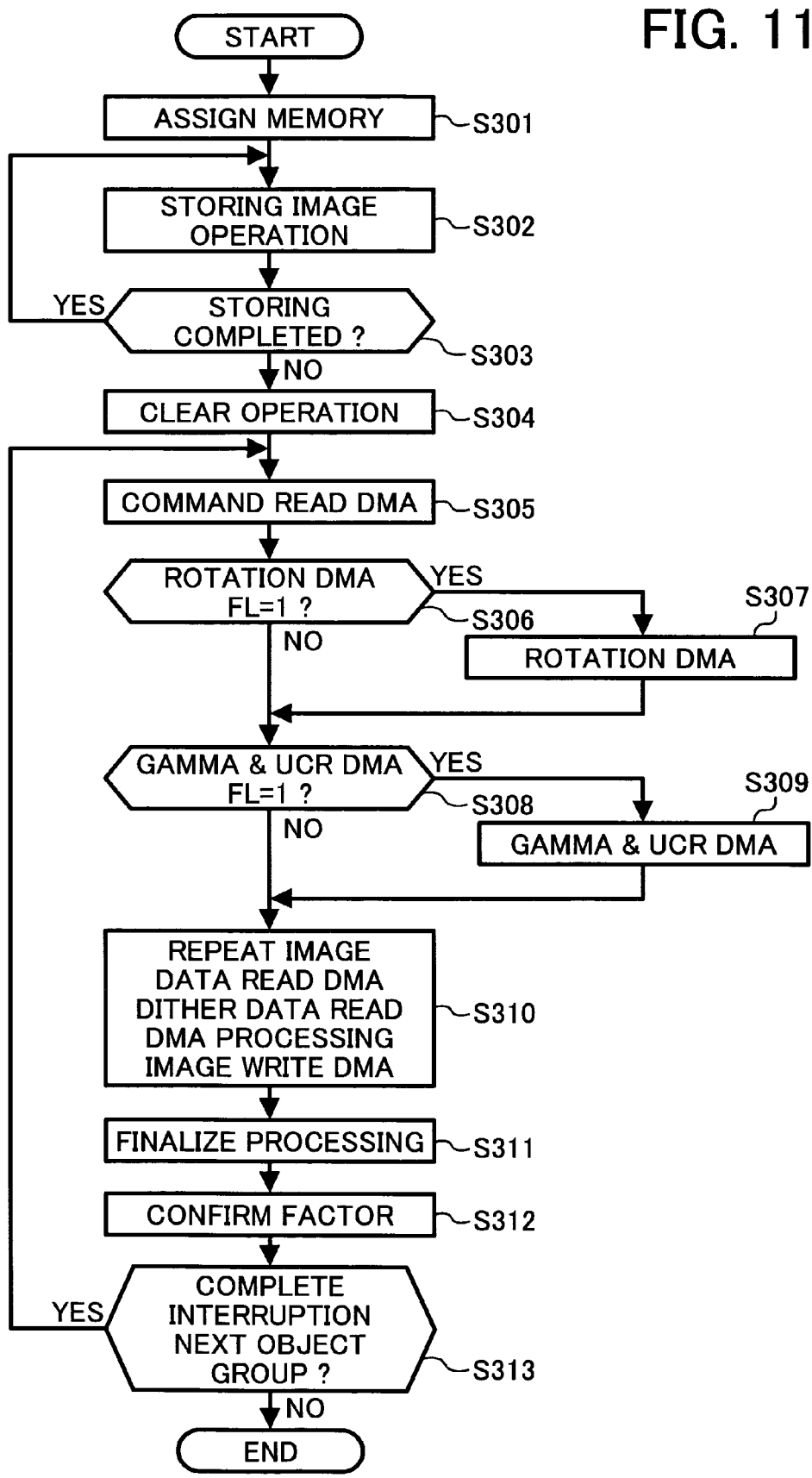
FIG. 11 is a flowchart of an example procedure of the image drawing shown in FIGS. 5-10.

FIG. 11 illustrates a flowchart of the drawing procedure explained in FIG. 5 to 10. According to the drawing procedure, a storage area in the main memory is assigned (Step S301) and a processed image data (an object) is stored into consecutive storage areas of the main memory 130 (Step S302) in accordance with a printer application. If the image data are a plurality of objects, the objects are connected and then are stored into the consecutive areas of the main memory 130. After the image data has been stored (Step S303), a CPU 200 sets a soft reset on a soft reset register so that an intermediate result of a previous process is made clear. (Step S304)

The CPU 200 accesses a KICK register of the IPA 100 to start the processing as described above. The IPA 100 begins with a process of a command DMA 1. (refer to FIG. 3 and FIG. 4) The command DMA 1 starts to read data at a starting addresses specified by a command register and sets it in register 122. (Step S305)

The command DMA 1 checks a rotation DMA flag whether a rotation DMA is requested. (Step S306) If the rotation DMA flag is "1", the rotation DMA 2 is performed. (Step S307) Otherwise, The command DMA 1 checks further a gamma & UCR flag whether the gamma & UCR is to be performed without performing the rotation DMA. (Step S308) If the gamma & UCR flag is "1", the gamma & UCR is performed. (Step S309) Otherwise, processing tasks such as source image data read DMA 4, dither data read DMA 5 and processing image write DMA 6 are performed at every line without performing the gamma & UCR processing.

All the target image data are processed and stored in the specified area of the main memory 130. (Step S310) Namely, in the step S310, the IPA 100 executes all the commands assigned in the main memory 130 and stores the processed image data in the main memory 130.

Then, the IPA 100 sends an interruption to the CPU 200 and finalizes the processing with writing a interruption factor to an INT_STATUS register. (Step S311) The CPU 200 reads the INT_STATUS register of the IPA 100 and confirms the interruption factor. (Step S312) If a complete interruption is requested and a next object follows, processing tasks after the step 305 are performed repeatedly. Otherwise, the CPU 200 finalizes the job.

Figure 12:
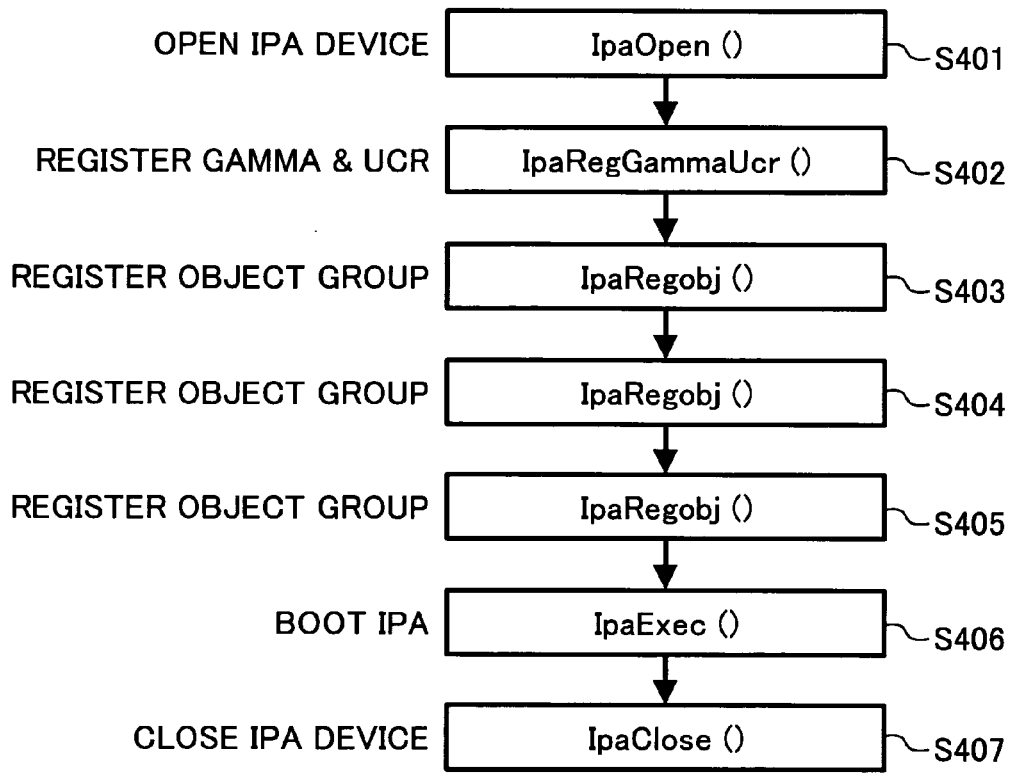
FIG. 12 is a flowchart of an alternative procedure of the image drawing shown in FIG. 11 by using a library and a device driver.

The processing described above is achieved with a library and a device driver. FIG. 12 illustrates a exemplary processing. An IPA device is opened (Step S401) and a gamma & URC data is registered. (Step S402) Then, groups of objects are registered. (Step S403 to S405) In this exemplary embodiment, a source image data are divided into three groups which are three object groups. Therefore, the registration for each object group is performed into the main memory 130 in each step S403, S404 and S405. After that, the IPA 100 is booted (Step S406) and the IPA device is closed. (Step S407)

As an alternative of performing the registration of the gamma & URC data in this exemplary embodiment, it is possible to perform a rotation processing only, or, to perform neither rotation processing nor gamma & URC processing. Thus, it is possible to perform a variety of successive image processing tasks by specifying a necessary operation modes. When the both rotation processing and gamma & URC processing are not performed, necessary operations is selected by the printer application in accordance with the PC (personal computer) panel, or, a direction from PC.

Figure 13:
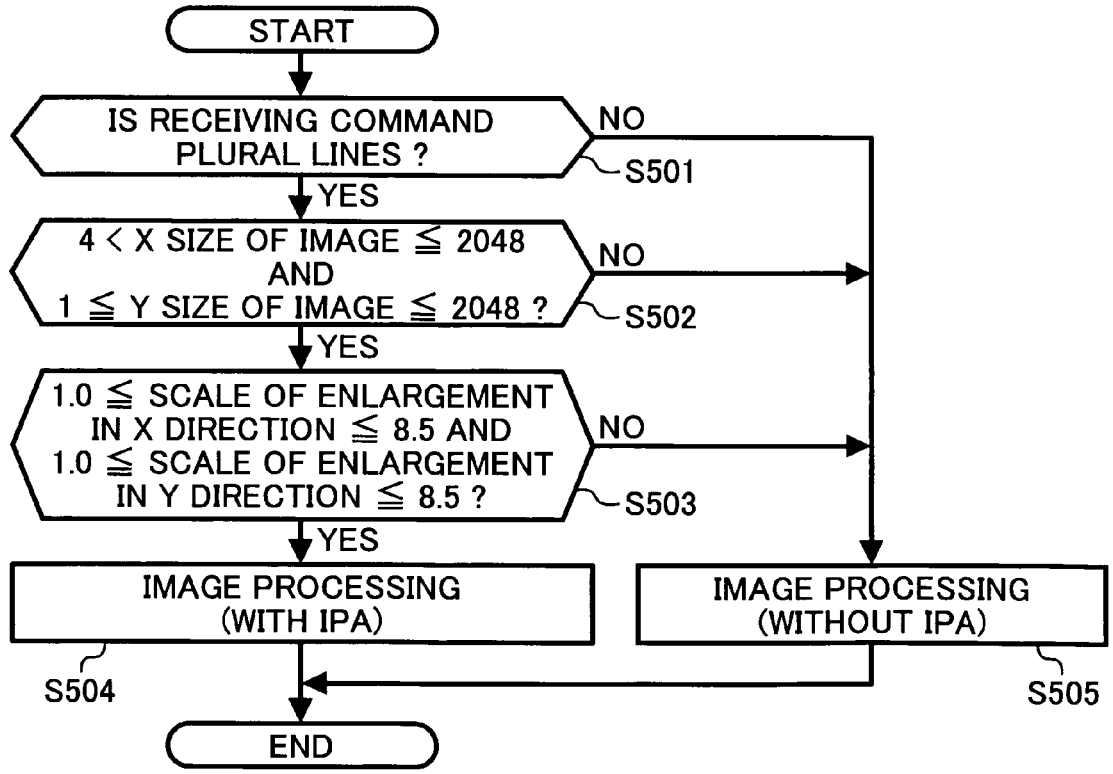
FIG. 13 is a flowchart of an example procedure to determine an use of the IPA.

The IPA 100 is booted at the step S406. However, the IPA 100 may not be booted. It depends on the processing data whether IPA 100 is used or not used. FIG. 13 illustrates a flowchart of a procedure to determine use/nonuse of the IPA 100. In this processing, it is checked whether a receiving command is a command for plural lines or for single line. (Step S501) If it is the command for the single line, a drawing processing is performed without using the IPA 100. (Step S501) If it is the command for the plural lines, sizes of the image data in a X-direction and a Y-direction are checked. After checking, it is judged whether the IPA 100 can handle the sizes of the image data.

In this embodiment, if the sizes of the image data satisfy the formula, $$4 < X \text{ size of image} = < 2048 \text{ and } 1 < Y \text{ size of image} = < 2048 \qquad \text{(formula 1)},$$

(a number is a pixel number), the IPA 100 can handle the image data. When the image data satisfy the formula 1, a scale of enlargement is checked further. If the size of the image is out of these range, drawing processing is implemented on the image data without using IPA 100. (Step S505)

In this exemplary embodiment, it is checked if the scales of enlargement of the image data satisfy the formula, 1.0<scale of enlargement in $X$ direction=<8.5 and
1.0<scale of enlargement in $Y$ direction=<8.5 (Formula 2).

If the image data has a side which is out of the range of the Formula 2, drawing processing is performed on the image data without using the IPA 100. (Step S505) If the image data has a side which is within the range of the Formula 2, drawing processing is performed on the image data using the IPA 100.

In another word, if the sizes and the scales of enlargement of the image satisfy the formula 1 and 2, the drawing processing is performed. Using this procedure, it is possible to perform a processing for a plurality of objects when a command for a plurality of receiving lines is received. Namely, a faster image processing and a high speed printing can be achieved by this procedure.

Figure 14:
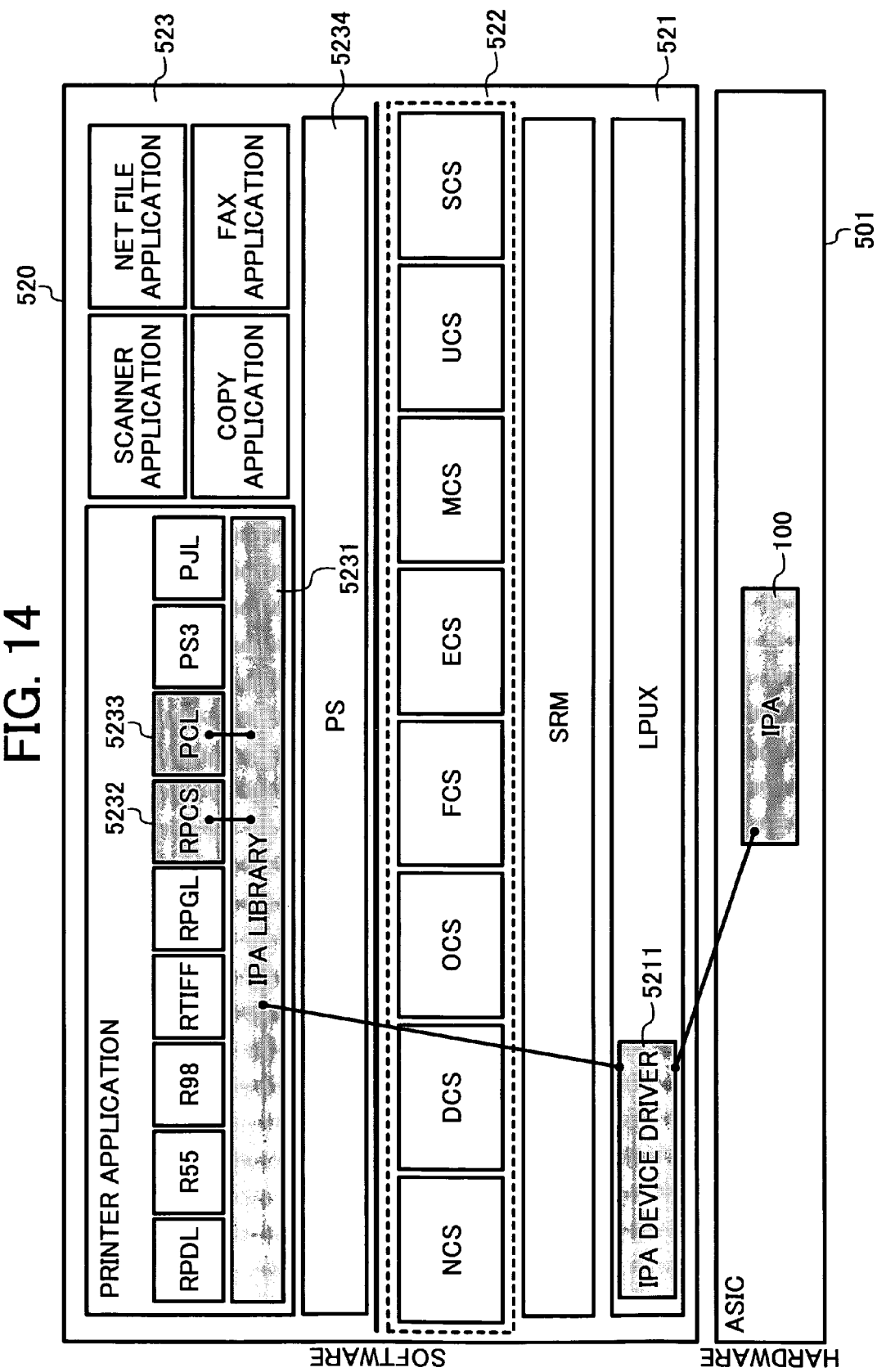
FIG. 14 illustrates an example software and hardware configuration which performs the image processing of FIG. 2.

FIG. 14 illustrates a configuration of a software and a hardware which performs the above-described processing. The hardware is configured with ASIC (Application Specific Integrated Circuit) and includes the IPA 100. The software 520 includes an OS (Operation System) 521, a service module layer 522 and an application module layer 523. The module layers include programs. The programs are stored in storage devices such as HDD, SDRAM and flash memory and the programs are read when they are requested. The CPU executes to control an apparatus in accordance with the program and to operate desired functionalities.

The one of the features of this embodiment is to include a driving software 520 which drives the IPA 100 of the hardware 501. The software 520 manages the IPA 100 to perform the image processing on the image data using a IPA device driver 5211 of the OS 521 and a IPA library 5231 in the application module layer 523. The IPA library 5231 is used with a RPCS (Refined Printing Request command) 5232 and a PCL (Printing Control Language) 5233. The process steps shown in FIG. 12 are performed by the IPA 100 in the hardware 501 with the IPA device driver 5211, the RPCS 5232 and the PCL 5233.

The software in the application module layer 523 includes a plurality of programs which make the CPU 200 an application control device to execute a desired function with necessary hardware resources. The software in the service module layer 522 is arranged to organize the CPU 200, hardware resources and application control devices.

The software in the service module layer 522 includes service control programs for receiving operation requests to the hardware resources from the CPU 200, arbitrating the operation requests, controlling the operations and executing in accordance with the operation requests. The OS 521 is one of operating systems such as UNIX (registered trademark) and manages the programs in the service module layer 522 and application module layer 523 for the parallel implementations.

The RPCS 5232 is a printer language which operates on a platform and is located in the layer shown in FIG. 14. The RPCS 5232 is a process defined by an user and is functioned by the print system (PS) 5234 as a part of printer application.

The language processing group including the RPCS 5232 is called CDC (Contents Description Command). The CDC manages to input RPCS data of a printer document which is generated by Windows (registered trademark), to interpret the data and to generate a page image in color or in monochrome.

Figure 15:
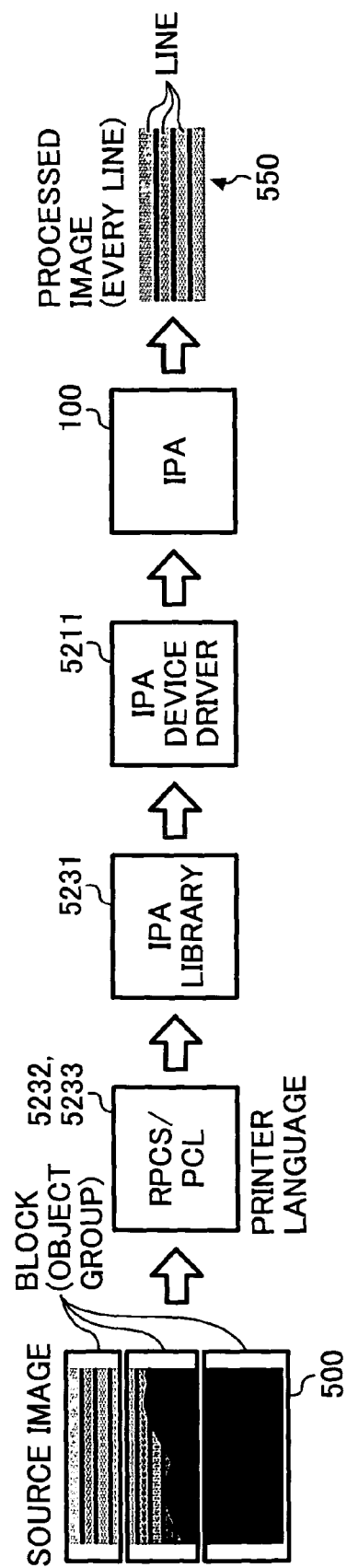
FIG. 15 is an illustration for explaining a basic process flow to print an image using the software and hardware configuration of FIG. 14.

FIG. 15 illustrates a basic process flow to print an image using the software and the hardware. A source image data is divided into three object groups and is stored in the main memory 130. The source image data stored in the main memory 130 is read and is translated to a RPCS description and the PCL languages. The IPA 100 performs the DMA processing tasks with the IPA library 5231 and the IPA device driver 5211 and outputs a processed image 550.

Figure 16:
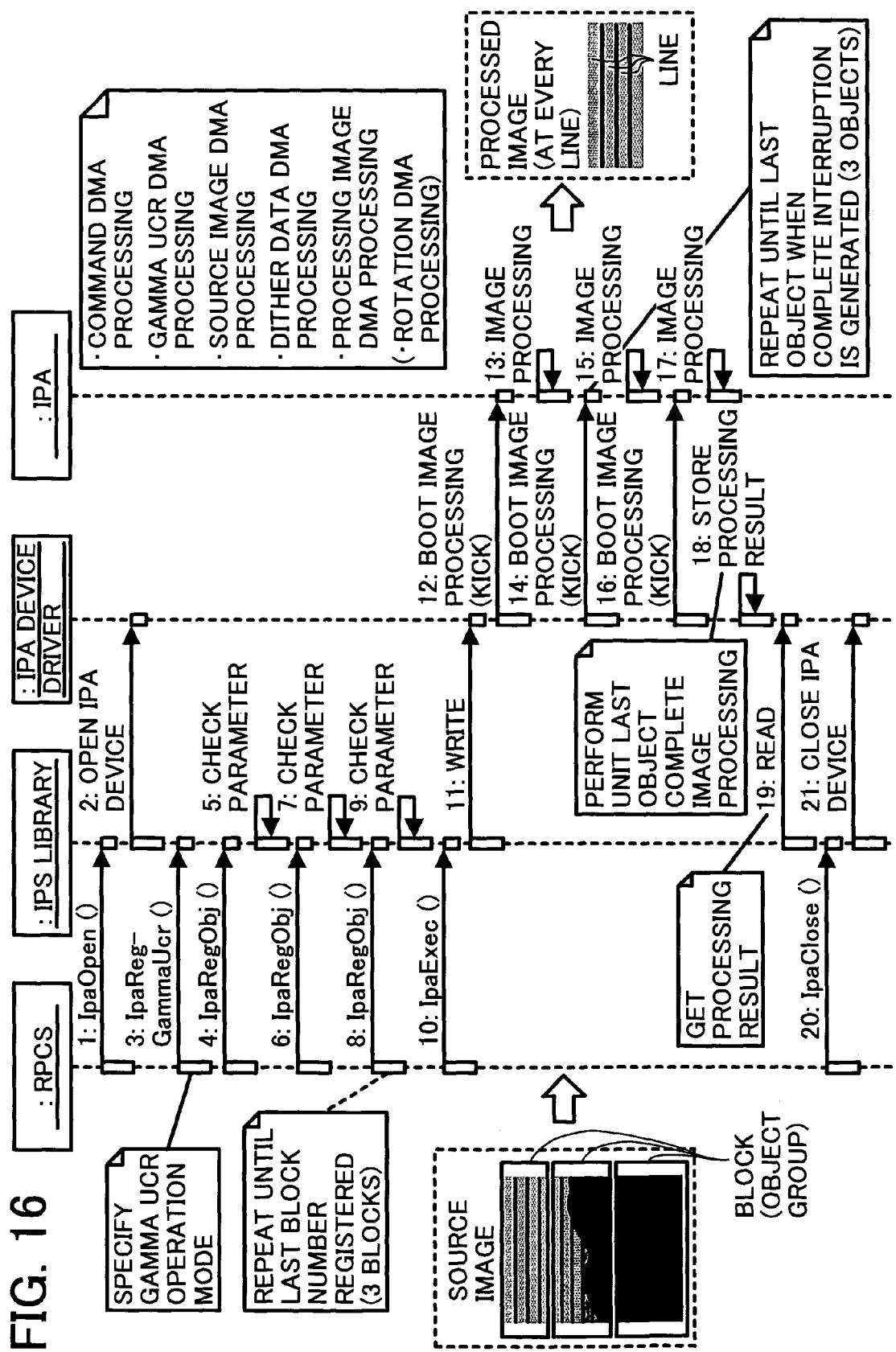
FIG. 16 is a sequential time chart of the basic process flow of FIG. 15.

FIG. 16 illustrates a sequence of the process steps. FIG. 17 is a library functions used in the sequence. When a function IpaOpen( ) is output from the RPCS 5232, the IPA device driver 5211 is opened with the IPA library 5231. Then, a function IpaRegGrammerUcr( ) is output from the RPCS 5232. Furthermore, a parameter is checked at each time when a function IpaRegObj( ) is output in accordance with each object group. When a function IpaExec( ) is output from the RPCS 5232, a command is written in the IPA device driver 5211 with the IPA library 5231. The IPA 100 is booted by the IPA device driver 5211 to start a drawing processing.

The IPA 100 performs the drawing processing as shown in FIGS. 3 and 4. When the complete interruption is generated, the drawing processing is repeated for the object group received. In this exemplary embodiment, the three object groups (step S403 to step S405) are being processed. Therefore, the drawing processing is repeated three times to draw the image which corresponds to the three object groups.

When the last object has been drawn, a report of the drawing result is stored in a register or in the main memory with the IPA device driver 5211. And the report of the drawing result is obtained by the IPA 100 with the IPA library 5231. When a function IpaClose( ) is output from the RPCS 5232, the IPA device is closed with the IPA library 5231.

The RPCS 5232 is performed by a printing command from an user PC (personal computer). FIG. 18 illustrates a sequence of the printing process steps. A data of a printing image command sent from the PC is received with the RPCS 5232 and an image is drawn in a color or in a monochrome after interpretation of the image data. When a print button is pushed, the printing process will be started with the RPCS 5232 through a Windows application 5235, a GDI (Graphic Device Interface) 5236 and a printer driver 5237. The GDI is a module for a graphic operation in the Windows kernel.

In this sequence, when the print button is pushed by the user, the GDI 5236 is accessed with the Windows application 3235 and a printing command is sent to the printer driver from the GDI 5236. At the printer driver 5237, the data is generated in accordance with the drawing command from the GDI 5236. Then the data is sent to the RPCS 5232. With the RPCS 5232, the data sent is interpreted and is stored as a image data in the main memory 130. After that, the image data is printed based on the sequence described in FIG. 16.

This printing process can be performed at common printers such as an electrophotographic printer and an inkjet printer. Namely, the printer can include functionalities described above installing this configuration. The procedures of the processing tasks are stored as a software in the ROM (Read Only Memory) or other type of memory and implemented with the IPA device driver 5211 and the IPA library 5231. The software may be stored in storage medias such as CD-ROM, SD-card and is read by computer to use. Furthermore, the software may be downloaded to the computer through a network.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. 2004-346255 filed on Nov. 30, 2004 in the Japan Patent Office, the entire contents of which are incorporated by reference herein.

What is claimed is:

1. A computer program product stored on a computer readable storage medium for, when run on a data processing apparatus, carrying out at least the following:

reading a source image from a storage;
processing the source image read from the storage with a library;
processing the source image with a device driver;
reading a command read DNA for reading commands from the storage;
determining an execution of a rotation DMA for performing rotation of the source image;
executing the rotation DMA;
storing a result of the execution of the rotation DMA into the storage;
determining an execution of a gamma-UCR processing DMA for performing gamma & UCR processing;
executing the gamma-UCR processing DMA;
storing a result of the execution of the gamma-UCR processing DMA into the storage;
executing an image data read DMA, a dither read DMA and a processing image write DMA per line after the executions of the rotation DMA and the gamma-UCR processing DMA; and
checking an existence of a complete interruption occurring at an absence of a following object.

2. A computer program stored on a computer readable storage medium for, when run on a data process apparatus, carrying out at least the following:

reading a source image from a storage;
processing the source image read from the storage with a library;
processing the source image with a device driver;
reading a command read DNA for reading commands from the storage;
determining an execution of a rotation DMA for performing rotation of the source image;
executing the rotation DMA;
storing a result of the execution of the rotation DMA into the storage;
determining an execution of a gamma-UCR processing DMA for performing gamma & UCR processing;
executing the gamma-UCR processing DMA;
storing a result of the execution of the gamma-UCR processing DMA into the storage;
executing an image data read DMA, a dither read DMA and a processing image write DMA per line after the executions of the rotation DMA and the gamma-UCR processing DMA;
checking an existence of a complete interruption occurring at an absence of a following object; and
printing an image in accordance with the processed image after the complete interruption existence checking step checks an existence of the complete interruption.

* * * * *